P. N. KILLINGER.
MEASURING INSTRUMENT.
APPLICATION FILED JULY 20, 1908. RENEWED JUNE 8, 1911.
1,014,232.
Patented Jan. 9, 1912.
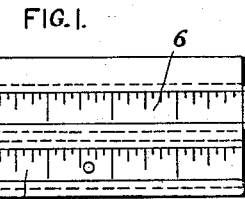
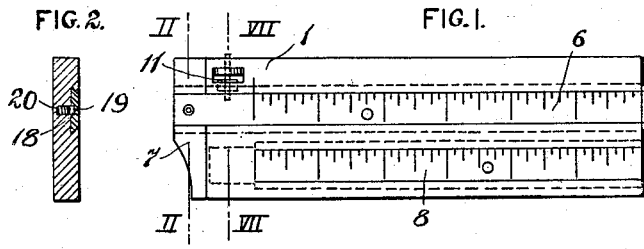
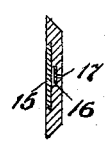
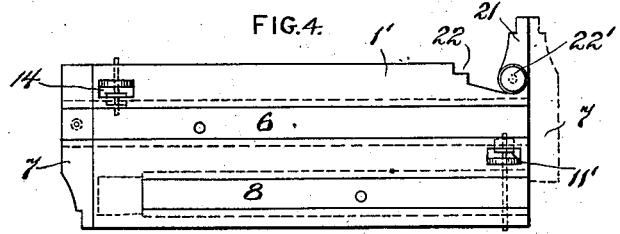
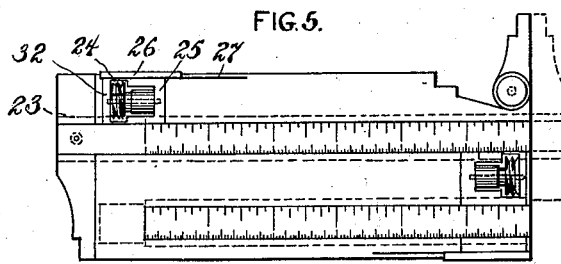
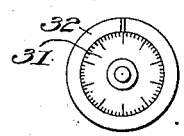
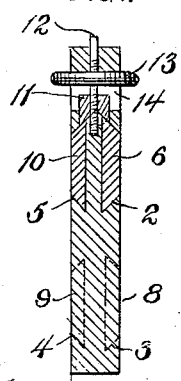
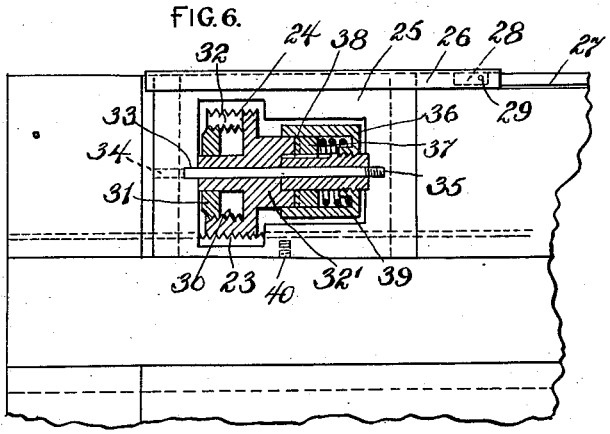
WITNESSES
INVENTOR

UNITED STATES PATENT OFFICE.

PHILIP N. KILLINGER, OF PITTSBURGH, PENNSYLVANIA.

MEASURING INSTRUMENT.

1,014,232. Specification of Letters Patent. Patented Jan. 9, 1912.

Application filed July 20, 1908, Serial No. 444,380. Renewed June 8, 1911. Serial No. 632,022.

*To all whom it may concern:*

Be it known that I, PHILIP N. KILLINGER, a citizen of the United States, residing at Pittsburgh, in the county of Allegheny and State of Pennsylvania, have invented certain new and useful Improvements in Measuring Instruments, of which the following is a specification.

The invention relates to measuring instruments and particularly to calipers. It has for its principal objects; the provision of a micrometer caliper which may be very rapidly adjusted to position with a slight amount of wear upon the micrometer operating parts; the provision of a caliper capable of a very wide range of adjustment, and one which may be used either for inside or outside work; and the provision of a caliper of wide range in compact form. Certain embodiments of the invention are illustrated in the accompanying drawings, wherein:—

Figure 1 is a side elevation of one form of device.

Figure 2 is a section on the line II—II of Figure 1.

Figure 3 is a section on the line III—III of Figure 1.

Figure 4 is a side elevation of a modified form of device.

Figure 5 is a side elevation of still another form of the device.

Figure 6 is an enlarged partial section and partial side elevation of the micrometer employed, and the parts in which the micrometer is mounted.

Figure 7 is an enlarged detail section on the line VII—VII of Figure 1.

Figure 8 is an elevation of the edge of the device as shown in Figure 6, the holding slide being broken away to more clearly disclose the mounting of the carrier block, and Figure 9 is an enlarged end view of the graduated worm.

Referring first to the construction of the caliper as illustrated in Figures 1, 2, 3 and 7, 1 is the body portion of the device provided with a plurality of longitudinal slideways 2, 3, 4 and 5 (Figure 7), 6 is a graduated bar fitting the slideway 2 and carrying a jaw or head 7, and 8, 9 and 10 are other graduated bars fitting the slideways 3, 4 and 5 respectively and adapted to be joined together and to the bar 6 to constitute an extended measuring bar. The measuring bar 6 may be clamped in any desired position by means of the block 11 illustrated in Figure 7, which block 11 is slidably mounted upon a pin 12. The pin 12 is mounted in the body portion 1 and the block is moved to clamping position by means of the disk 13 threaded on the pin and lying in the recess 14. The sections 6, 8, 9 and 10 are adapted to be jointed together to increase the capacity of the caliper, and one means for conveniently securing these parts in jointed relation is indicated at the right hand end of Figure 1, and in cross section of Figure 3. As here shown the section 8 which has already been secured to the section 6, is jointed to the section 9 by means of the reduced portion 15 on the section 9, which fits into a corresponding recess in the end of the section 8. The parts are prevented from accidental displacement by means of a small spring 16 secured to the member 9 and projecting up into a slight recess in the face of the reduced portion 15. The spring is disengaged from the member 15 by means of a pin which is pressed down through a perforation 17, so that the spring is depressed. Other securing means between the sections might of course be substituted for the one just described, the only requirement being that there be no projecting parts, so that the joint may slide freely through the slideway 2 in the body portion 1. By the foregoing arrangement a caliper of large capacity is secured, which may be fitted together in very compact form when not in use. The number of sections used may also be increased if desired to meet requirements. The head 7 is preferably made detachable from the section 6, and this is accomplished by means of a spring-held pin 18 (Fig. 2) carried by the head 7, and fitting into a recess in the section 6, a hole 19 being provided for the insertion of a pin to press the part 18 back when it is desired to release the head. The part 18 is held in advanced position by means of the spring 20.

In Fig. 4 a somewhat modified construction is illustrated, the purpose being to adapt the construction of Figs. 1, 2 and 3 to inside work as well as outside work. To this end the folding arm 21 is provided, which arm is adapted to fit into a recess 22 in the body portion 1' and is held either in closed or open position by means of an ordinary clamping screw 22'. When it is desired to use the caliper for inside work the section 6 with its head 7 is withdrawn from the slideway 2 and inserted in the opposite end of such slideway, so that the head 7 occupies the position shown in dotted lines at the right hand end of Fig. 4. The arm 21 may also be removed by removing the clamping screw 22'. If desired a longer head than the head 7 may be substituted therefor and an arm longer than the arm 21 substituted for such arm to suit varying conditions. The arm 21 may also be used in conjunction with the head 7 for outside as well as inside work. When the caliper is thus reversed for inside work an additional holding block 11' with operating devices is of course necessary, such parts being located as indicated at the right hand end of Figure 4.

In Figures 5, 6 and 8 still another modification of the construction is illustrated, such modification differing from the construction of Figure 4 primarily in the addition of a micrometer attachment for giving measurements intermediate the graduations on the measuring bars. To this end the edge of the graduated bar is provided with a rack 23 which engages a worm 24 mounted in a slide block 25. The purpose of mounting the worm in the slide block is to permit the approximate and rapid adjustment of the graduated bar to position preliminary to the use of the micrometer attachment, thus increasing the speed of operation and reducing the wear upon the micrometer parts. In order to hold the block 25 in position the slide 26 is provided, and this slide is U shaped in cross section and adapted to engage a groove 27 on each side of the body portion and the block. The slide is prevented from accidentally moving from the position shown in Fig. 6 by means of a spring 28 secured to the body portion and corresponding to the springs 16 shown in Figs. 1 and 2. The end of the spring is adapted to engage a small recess in the inner surface of the slide 26 and may be detached therefrom by means of the insertion of a pin through the hole 29 as heretofore described. The worm 24 is recessed interiorly as shown in Figure 6, and screw threaded interiorly at 30 on a slight taper. This threaded portion 30 is engaged by a disk 31, and by screwing this disk 31 slightly inward the worm may be expanded to compensate for wear, the worm being provided with one or more slots 32 to provide for its expansion. The disk 31 is also provided on its outer face with graduations. The top surface of the block 25 adjacent the periphery of the disk 31 may be used as a zero mark from which the graduations are counted. The worm 24 is provided with a hub-portion 32' which is mounted upon a pin 33, such pin being inserted through an opening 34 in the block 25 and screw threaded at its other end 35 into the block. The hub 32' and worm 24 carried thereby are turned by means of the nut 36 which nut has sliding engagement with a disk 37. This disk 37 is provided with ratchet teeth 38 adapted to engage corresponding teeth on the hub 32', and is held yieldingly to the left by means of the spring 39, which arrangement insures a proper amount of turning pressure upon the worm. In order to automatically move the block 25 outwardly and disengage the worm from the rack when the slide 26 is moved to the right, the small springs 40 seated in recesses in the block and bearing against the body portion are provided.

Having thus described my invention and illustrated its use, what I claim as new and desire to secure by Letters Patent is the following:—

1. In a device of the character described, a body portion 1 provided with a slideway 2 extending throughout the length of the body portion and with another slideway 3 of the same cross section as the slideway 2, a graduated measuring section 6 mounted in the slideway 2 and provided with a head 7, another graduated measuring section 8 adapted to fit the slideway 3 and having a cross section the same as that of the section 6, and means at the ends of the sections whereby they may be detachably joined together, the said means being constructed to permit the joined part to slide freely through the slideway 2.

2. In a device of the character described, a body portion having an end adapted to act as a jaw and a slideway extending longitudinally through the body portion, a bar mounted in the slideway and provided with a jaw adapted to oppose the jaw end on the body portion, and another jaw mounted on the other end of the body portion and projecting from the side thereof in position to coöperate with the movable jaw for inside work when the bar is reversed in the slideway.

3. In a device of the character described, a body portion having an end adapted to act as a jaw and a slideway extending longitudinally through the body portion, a bar mounted in the slideway and provided with a jaw adapted to oppose the jaw end on the body portion, and a foldable jaw mounted on the other end of the body portion and adapted when open to project from the side thereof in position to coöperate with the movable jaw for inside work when the bar is reversed in the slideway.

4. In a device of the character described, a body portion provided on one side with a groove constituting a slideway, a flat graduated measuring bar mounted therein and provided on the edge with a rack, a graduated operating worm therefor and means whereby the worm may be moved laterally to disengage it from the rack.

5. In a device of the character described, a body portion provided with a slideway, a graduated measuring bar mounted therein and provided on the edge with a rack consisting of tapering teeth, and an expansible graduated operating worm therefor having a correspondingly shaped thread.

6. In a device of the character described, a body portion provided with a slideway, a graduated measuring bar mounted therein and provided on the edge with a rack, a block slidable toward and from the rack, a graduated operating worm mounted thereon and adapted to engage the rack when the block is in one position and to be disengaged therefrom when the rack is in another position, and means for rigidly maintaining the worm in engaged position.

7. In a device of the character described, a body portion provided with a slideway, a graduated measuring bar mounted therein and provided on the edge with a rack, an operating worm mounted in the body portion and engaging the rack, and a graduated disk mounted to rotate with the worm but rotatively adjustable with respect thereto.

8. In a device of the character described, a body portion having an end adapted to act as a jaw and a slideway extending longitudinally through the body portion, a bar mounted in the slideway and provided with a detachable jaw adapted to oppose the jaw on the body portion, and another detachable jaw mounted on the other end of the body portion and projecting from the side thereof in position to coöperate with the first detachable jaw when the bar is reversed in the slideway.

In testimony whereof I have hereunto signed my name in the presence of the two subscribed witnesses.

P. N. KILLINGER.

Witnesses:
HARVEY L. LECHNER,
J. C. BRADLEY.

Copies of this patent may be obtained for five cents each, by addressing the "Commissioner of Patents, Washington, D. C."